United States Patent [19]

Lee

[11] Patent Number: 5,026,091
[45] Date of Patent: Jun. 25, 1991

[54] ANTI-ROLL SYSTEM USING CASTER CONTROL FOR USE IN VEHICLES

[75] Inventor: Un K. Lee, Ulsan, Rep. of Korea

[73] Assignee: Hyundai Motor Company, Seoul, Rep. of Korea

[21] Appl. No.: 454,626

[22] Filed: Dec. 21, 1989

[30] Foreign Application Priority Data

Dec. 23, 1988 [KR] Rep. of Korea .................... 88-17347

[51] Int. Cl.$^5$ ............................................. B60G 7/00
[52] U.S. Cl. ..................................... 280/675; 280/689
[58] Field of Search ............... 280/772, 675, 689, 673

[56] References Cited

U.S. PATENT DOCUMENTS

| | | | |
|---|---|---|---|
| 3,485,506 | 12/1969 | Melbar et al. | 280/772 |
| 4,756,546 | 7/1988 | Kubo et al. | 280/675 |
| 4,819,959 | 4/1989 | Inoue et al. | 280/675 |
| 4,842,296 | 6/1989 | Kubo | 280/675 |

*Primary Examiner*—Kenneth R. Rice
*Attorney, Agent, or Firm*—Birch, Stewart, Kolasch & Birch

[57] ABSTRACT

An anti-roll system using a caster control for use in vehicles and more particularly, a steering system having an anti-roll system which includes a plurality of links for easily converting the caster and adding an anti-roll function generated by turning the front wheels so as to realize a secure posture and improve the turning function of the vehicles.

2 Claims, 4 Drawing Sheets

ANTI-ROLL SYSTEM USING CASTER CONTROL
FOR USE IN VEHICLES

BACKGROUND OF THE INVENTION

1. Field of the Invention

The present invention relates to an anti-roll system using a caster control for use in vehicles and more particularly, a steering system having a anti-roll system which includes an plurality of links for easily shifting the caster shifting of the caster occurs automatically during, and as a result of, turning the front wheels, so as to realize a secure vehicle posture and improve the turning function of the vehicle.

2. Description of the Prior Art

Generally, it is desired to improve the turning function of vehicles and to furnish a pleasant feeling of high security for the passengers in the vehicles.

Various types of mechanism have been developed in which, for example, the steering devices include the front wheels, suspension mechanisms, electric apparatuses and the like. However, there are many problems such as rolling, security, and the which the front wheels can particularly play a great role in solving.

Thus the front wheels can assist the steering mechanism in obtaining a more secure turning function. In this connection, the front wheels are connected to the front axle in a geometrical relationship thereto and such geometrically related installation is called a front-wheel alignment.

The front-wheel alignment consists of four factors as follows:

(1) a toe-in for preventing the trend of outward spreading of the wheels when the car is running;
(2) a camber for alleviating the burden of manipulating the steering wheel and preventing the deflection of the front axle;
(3) a caster for furnishing a direct-advancing ability and a restoring ability to the front wheels; and
(4) a steering axis inclination for facilitating turning of the handle by furnishing a restoring ability to the steering-wheel.

Normally a positive caster is provided to the front wheels in order to improve the direct-advancing ability and the restoring ability in most cars. This positive (+) caster causes the body of the car to incline outwardly during turning. In particular, as shown in FIG. 6, a first rolling moment (hereinafter "Mi") is generated by the outward side inertia of the car body. A second rolling moment (hereinafter "Mc") due to the centrifugal force and depending on the turning radius and the car speed is also created. The sum of the two is a considerably large rolling moment (hereinafter "Mr (Mi+Mc)") generated when the car turns.

Accordingly, when the rolling moment Mr is large in a car, the rider experiences a feeling of insecurity to which the weight of the passengers actually contributes.

Due to this condition, many researchers have attempted to improve the turning performance of cars by inhibiting rolling during a turn. At present, however, most cars untilze a method whereby the lateral acceleration of the car is detected by means of a sensor, and rolling is inhibited by means of an hydraulic or pneumatic device based on the detected result.

Such hydraulic or pneumatic devices may also operate to inhibit rolling based upon detecting the car speed, the turning angle, the slope of the road, the condition of the road surface, and the like during the running of the car. Using the detected results, the overall stabilization of the posture of the car is maintained by raising or lowering the body of the car by means of physical force. This method provides a good result operationally, but suffers the disadvantage that a large number of components are required but and the hydraulic or pneumatic device is a technology-intensive device. Therefore, the method requires a large installation space and is expensive to manufacture. Particularly, in small cars, it requires so much of the design space that a limitation is imposed when assembling or disassembling the structure.

SUMMARY OF THE INVENTION

Accordingly, it is an object of the present invention to provide an improved anti-roll system for use in vehicles for overcoming the above-described disadvantages of the conventional techniques.

Another object of the present invention is to provide an anti-roll system using a caster control, wherein the left wheels of the car are given a negative (−) caster during a left turn, and the right wheels are given a positive (+) caster, or both the left and right wheels are given a negative (−) caster and thereby security to the car during its turning is provided.

A further object of the present invention is to provide an anti-roll system for vehicles which includes a multi-link system consisting of four or five links adapted so that the advantage of the caster of the suspension is be maintained intact during a turn. In particular, when the steering-wheel is turned to make the car turn, the vehicle wheel having a positive caster is shifted to a negative caster via a change in the condition of the links and A tighter turning radius results in a larger negative caster, whereby the anti-roll system inhibits rolling during a turn so that the car obtains postural stabilization.

For a more thorough understanding of the device of the present invention, a description will be made of the caster control mechanism.

Caster is the angle that the steering axis is offset from the vertical, measured from front to back. If the steering knuckle tilts toward the back, caster is positive (as shown in FIG. 4). If the steering knuckle tilts toward the front, caster is negative (as shown in FIG. 5). If the steering knuckle had no tilt front to back, then caster would be zero.

When the car turns, the caster determines the posture of the car, which posture in turn determines the postural stabilization of the car. For example, when a car turns left and all the left and right wheels have positive caster, the left portion of the body of the car is raised and the right portion of the body is lowered. Therefore, there is a danger that the car might flip over in a worst case. When the left wheels have a positive caster and the right wheels have a negative caster, all the left and right portions of the car are raised. Although the inclination of the car is reduced, the center of gravity of the body of the car is raised, thereby slightly aggravating the postural instability of the car.

By contrast, the caster control mechanism of the present invention operates such that during a left turn, the left wheels have a negative castor, and the right wheels have a positive castor caster, so that, both the left and right portions of the body of the car are lowered with the result is that not only the inclining trend of the car is reduced but also the center of gravity of car is lowered owing to the lowering of the body of the car. This brings the ultimate result that the turning performance of the car is improved. The present invention can alternatively operate such that both the left and right wheels have negative caster, so that, the left portion of the body of the car is lowered and the right portion of the body of the car is raised, with the result that the greatest postural security is achieved.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention relates to an anti-roll system using a caster control for use in vehicles and more particularly, to a steering system having an anti-roll system which includes a plurality of links for easily shifting the caster shifting of the caster occurs automatically and as a result of turning the front wheels so as to realize a secure posture and improve the turning function of the vehicles.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Referring now in detail to the drawings for the purpose of illustrating preferred embodiments of the present invention, after driving a straight road, when the front wheels are turned to make a turn, the state of the links is changed and a shift is made from a positive (+) caster to a negative (−) caster so that the body of the car is inclined toward the inside of the turning arc. In order to achieve this, first of all, a theoretical kingpin axis is shifted each time the a steering rack position state is changed and in order to achieve this, a multi-link system consisting of four or five links is provided.

Figure 1A:
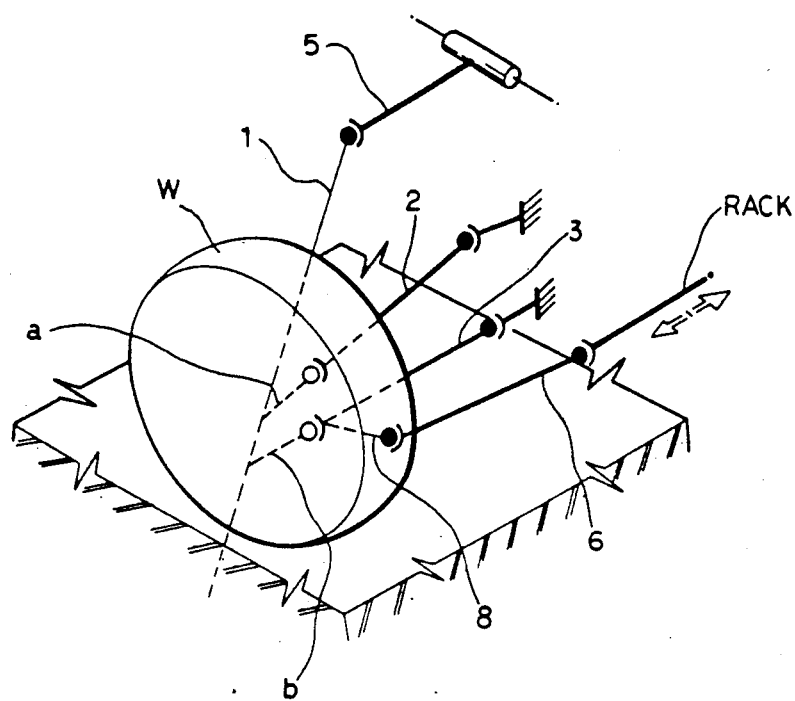
FIG. 1(a) schematically illustrates the constitution of the four-link anti-roll mechanism of the present invention.
Figure 1B:
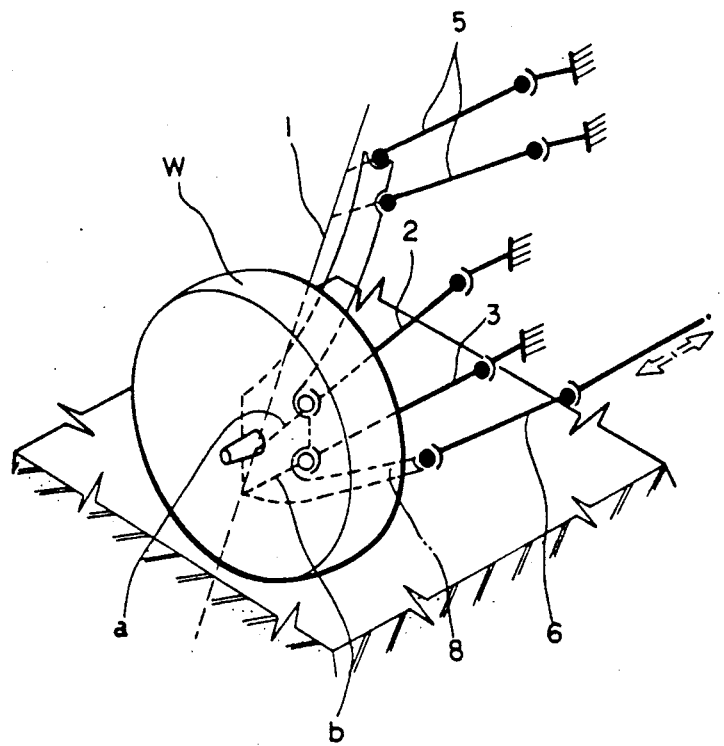
FIG. 1(b) schematically illustrates the constitution of the five-link anti-roll mechanism of the present invention.

In this connection, a description will be made referring to FIG. 1(a) in which a four-link system is adopted.

Figure 2:
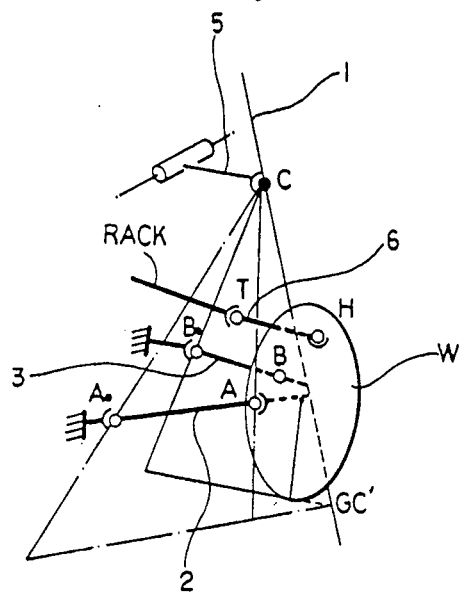
FIG. 2 is a schematical view showing the angles formed in the preferred embodiment of the present invention.

The car body and the upper and lower portions of a steering knuckle are connected to an upper link 5 and lower links 2 and 3. The steering knuckle is also connected through a fourth link tie rod 6 to the steering gear box of the car body. The upper link 5, the lower links 2 and 3, and the tie rod 6 are connected to a knuckle arm 8 by ball joints. The knuckle arm 8 is integrally formed with the steering knuckle. Thus, during steering, the movements of a rack disposed within the steering gear box pull and push the tie rod 6 wherein the knuckle arm 8 is operated in accordance therewith. Upper link 5 and lower links 2 and 3 define a theoretical kingpin axis 1. As shown in FIG. 2, theoretical kingpin axis 1 passes through the balljoint point C which connects upper line 5 to the steering knuckle and through the intersection of the extension lines (a and b in FIG. 1(a) or A.A and B.B in FIG. 2) which are the extensions of lower links 2 and 3 respectively. This theoretical kingpin axis is the steering axis whose tilt from front to back is referred to as caster.

Figure 3A:
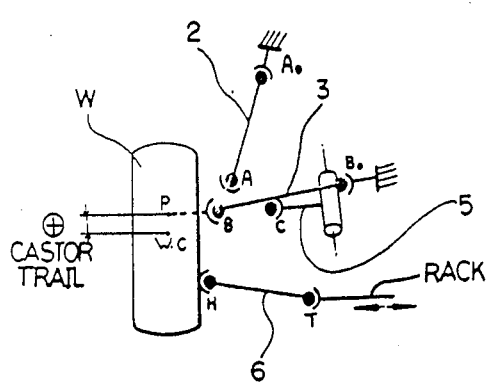
FIGS. 3(a), 3(b) and 3(c) illustrate examples of the operations of the device of the present invention.
Figure 3B:
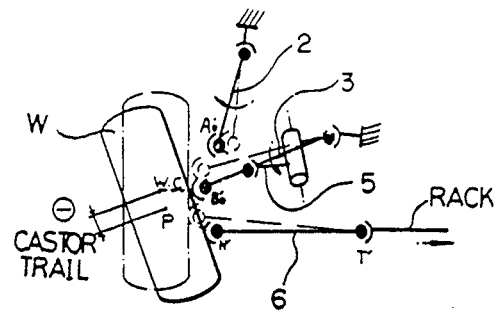
Figure 3C:
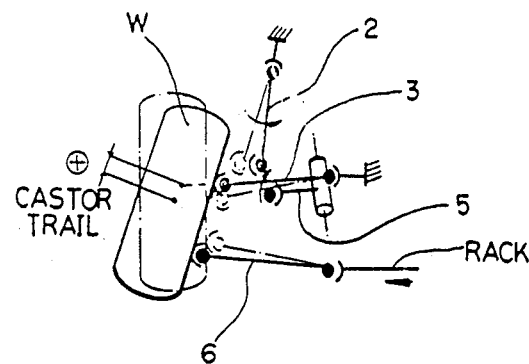

The theoretical kingpin axis 1 is also the intersection of plane CB.B and plane CA.A as shown in FIG. 2. Point GC' in FIG. 2 (point P in FIGS. 3(a) and 3(b)) is the point where the theoretical kingpin axis intersects the ground. Point WC in FIGS. 3(a) and 3(b) is the point on the ground directly below the wheel center. The line connecting points WC and P is called Caster Trail. Accordingly, during steering the wheels are pivoted around the theoretical kingpin axis 1 such steering that is performed. During the steering operation, tiny displacements occur on the upper link 5 and the lower links 2 and 3 so that displacements of the lower links 2 and 3 alter the state of the arrangement of the links and thereby the position of the theoretical axis.

The geometrical placement of the links relative to one another and relative to tie rod 6 is designed such that the tiny displacements of the links cause shifting of the caster during turning. Tire rod 6 is positioned rearwardly of the center of the wheel, and the shifting of the caster is as specified in the following Table.

TABLE

| Steering rack stroke (mm) | +80 | +40 | 0 | −40 | −80 |
|---|---|---|---|---|---|
| Caster of front wheels | 2°40' | 1°47' | 0°36' | −0°55' | −3°27' |

Figure 4:
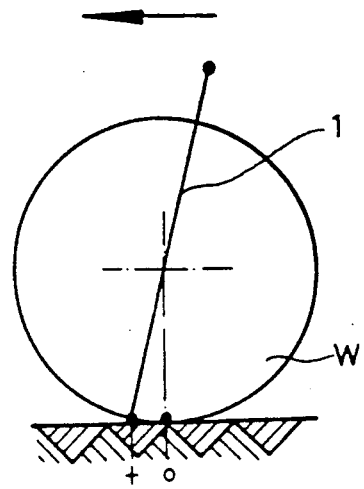
FIGS. 4 and 5 illustrate the shifting of the caster.
Figure 5:
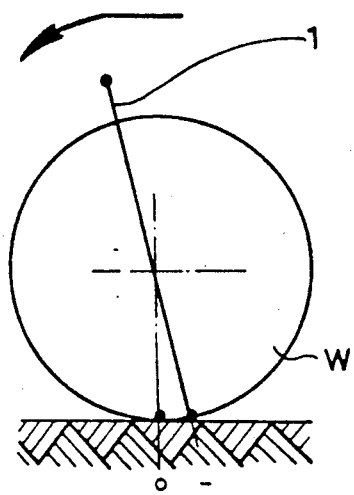
Figure 6:
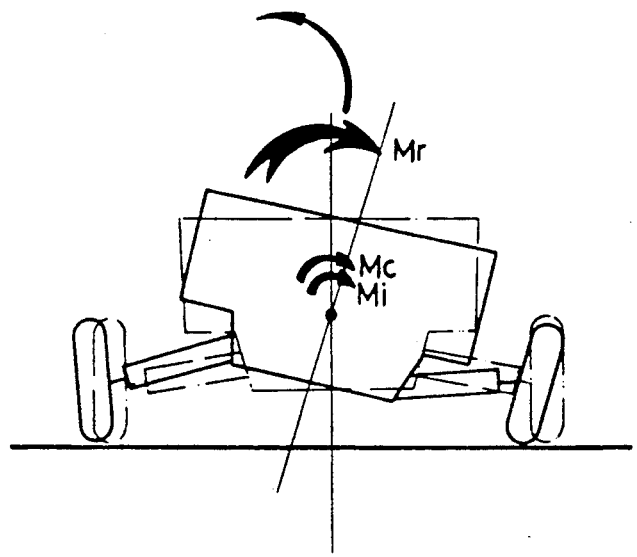
FIG. 6 is a schematical view showing an unsecured posture of the car during steering with a positive caster.
Figure 7:
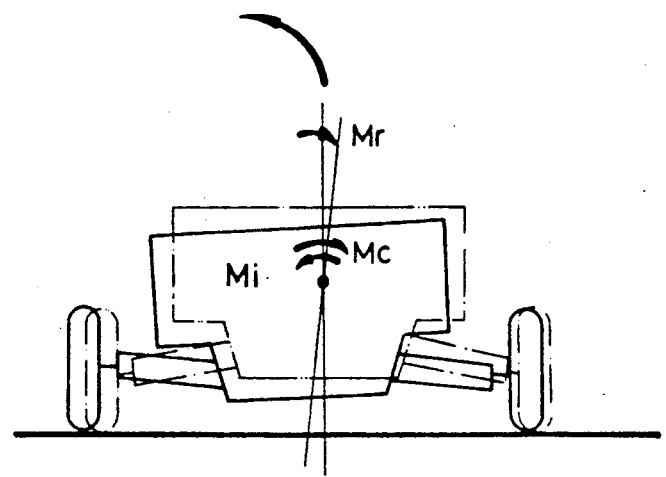
FIG. 7 is a schematical view showing a secure posture of the car during a left turn in which the device of the present invention is adopted.

In the case of performing a left turn, the rack of the steering gear box moves rightwardly, and the rack pulls the tie rod 6 which in turn pulls the knuckle arm 8 so that the knuckle arm 8 is operated from the state of FIG. 3(a) to the state of FIG. 3(b). Consequently, the knuckle pivots about the theoretical kingpin axis 1 to effect turning, and the knuckle arm 8 changes the positions of the lower links 2 and 3. The result is that the inclination of the theoretical kingpin axis 1 changes. As a result, a shifting is made from the positive castor angle of FIG. 4 to the negative caster of FIG. 5 so that the body of the car is lowered as shown in FIG. 7. Accordingly, the car is capable of performing a left turn in a secure manner.

FIG. 3(a) illustrates a neutral state of the steering wheel during the running of a car. When the car starts a left turn, the link state of the suspension is shifted from the state of FIG. 3(a) to the state of FIG. 3(b). The Ao, Bo, H and T are shifted to Ao', Bo', H', and T', respectively, so that the lower portion of CGC' is inclined toward the rear to produce a negative (−) castor angle. Accordingly, when the car makes a left turn, the portion of the body of the car corresponding to the inside of the turning arc is lowered together with the portion of the car body corresponding to the outside of the turning arc. Therefore, the center of the gravity of the car is lowered, thereby reducing the rolling moment.

The device of the present invention constituted as described above provides an anti-roll function by means of a pure link mechanism. That is, during a turn, the caster is shifted from a positive angle to a negative angle, in such a manner that the anti-roll mechanism causes a gradual shifting from the condition of positive caster on both front wheels to the condition of negative caster on the front wheel toward the inside of the turn and positive caster on the front wheel toward the outside of the turn. Alternately, a gradual shifting occurs from the condition of positive caster on both front wheels to the condition of negative caster on both front wheels. In either case, a secure steering effect is achieved.

The conventional system in which the posture of the car is detected by means of a sensor and is controlled by means of an hydraulic or pneumatic device can be replaced with the device of the present invention. Therefore, a number of advantages such as economy, utility, postural stability, diversified functions and the like can be obtained.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. An anti-roll system for vehicles comprising:
   an upper link and a plurality of lower links, said links connecting a vehicle body to vehicle front wheels via steering knuckles, said links connected to said knuckles via ball joints,
   a steering rack disposed within a steering gear box, said steering rack connected to said steering knuckles via tie rods and steering arms, said steering arms formed integrally with the steering knuckles, said tie rods positioned rearwardly of center of the vehicle wheels,
   a theoretical kingpin axis defined as a line passing through the ball joint connecting the upper link to the knuckle and through a point of intersection of two extension lines of the lower links,
   a caster defined as a tilt angle of the theoretical kingpin axis from vertical when viewed from a side of the vehicle, positive caster defined as tilt angle toward the vehicle rear and negative caster defined as tilt angle toward the vehicle front,
   the upper and lower links configured and connected to the knuckle whereby the vehicle wheels have positive caster during straight driving, and during a turn, shifting of the steering rack pivots the knuckle causing tiny displacements of the links such that the positive caster shifts to negative caster on the wheel toward the inside of a turn.

2. An anti-roll system for vehicles comprising:
   an upper link and a plurality of lower links, said links connecting a vehicle body to vehicle front wheels via steering knuckles, said links connected to said knuckles via ball joints,
   a steering rack disposed within a steering gear box, said steering rack connected to said steering knuckles via tie rods and steering arms, said steering arms formed integrally with the steering knuckles, said tie rods positioned rearwardly of center of the vehicle wheels,
   a theoretical kingpin axis defined as a line passing through the ball joint connecting the upper link to the knuckle and through a point of intersection of two extension lines of the lower links,
   a caster defined as a tilt angle of the theoretical kingpin axis from vertical when viewed from a side of the vehicle, positive caster defined as tilt angle toward the vehicle rear and negative caster defined as tilt angle toward the vehicle front,
   the upper and lower links configured and connected to the knuckle whereby the vehicle wheels have positive caster during straight driving, and during a turn, shifting of the steering rack pivots the knuckle causing tiny displacements of the links such that the positive caster shifts to negative caster.

* * * * *